United States Patent [19]

Ichikawa et al.

[11] Patent Number: 4,963,865
[45] Date of Patent: Oct. 16, 1990

[54] APPARATUS FOR DISPLAYING TRAVEL PATH

[75] Inventors: Akira Ichikawa; Akira Iihoshi; Yukinobu Nakamura; Shinichiro Yasui, all of Saitama, Japan

[73] Assignee: Honda Giken Kogyo Kabushiki Kaisha, Tokyo, Japan

[21] Appl. No.: 25,848

[22] Filed: Mar. 16, 1987

[30] Foreign Application Priority Data

Mar. 14, 1986 [JP] Japan .............................. 61-057944
Mar. 14, 1986 [JP] Japan .............................. 61-057946
Mar. 14, 1986 [JP] Japan .............................. 61-057943

[51] Int. Cl.$^5$ ............................................. G06F 15/50
[52] U.S. Cl. ................................. 340/995; 73/178 R; 340/990; 364/449
[58] Field of Search .............. 340/991, 995, 988, 990; 364/424, 444, 449; 73/178 R

[56] References Cited

U.S. PATENT DOCUMENTS

| | | | |
|---|---|---|---|
| 4,437,085 | 3/1984 | Salant | 340/990 |
| 4,608,656 | 8/1986 | Tanaka et al. | 340/995 |
| 4,677,561 | 6/1987 | Akama et al. | 340/995 |
| 4,677,562 | 6/1987 | Uota et al. | 340/995 |
| 4,677,563 | 6/1987 | Itoh et al. | 340/995 |
| 4,736,303 | 4/1988 | Itoh et al. | 340/995 |
| 4,763,269 | 8/1988 | Suyama et al. | 364/444 |
| 4,791,572 | 12/1988 | Green, III et al. | 340/995 |

*Primary Examiner*—Joseph A. Orsino
*Assistant Examiner*—Brent A. Swarthout
*Attorney, Agent, or Firm*—Lyon & Lyon

[57] ABSTRACT

There is disclosed an apparatus for displaying a travel path of a running body in which a constantly changing location of the running body on a two-dimensional coordinates is successively computed and the current location of said running body is displayed successively, in accordance with the data thus computed, on a display screen having a map previously displayed thereon. According to this apparatus, longitude and latitude values of a reference point in a mesh consisting of lines of longitude and latitude in each map of divided areas are registered as known factors and the current location of the running body on the two-dimensional coordinates thus computed is converted to a location on longitude-latitude coordinates, whereby the current location on the map is calculated from the known longitude and latitude values of the reference point displayed on the display screen.

4 Claims, 5 Drawing Sheets

APPARATUS FOR DISPLAYING TRAVEL PATH

BACKGROUND OF THE INVENTION

1. Field of the Invention

The present invention relates to a travel path displaying apparatus in which a current location and a path of travel of a running body, such as an automobile, (hereinafter referred to as a vehicle) are displayed on a display screen which has a map previously displayed thereon and more particularly, it relates to a system for displaying a current location of a running body on a map.

2. Description of the Prior Art

Recently, in an attempt to provide a guidance to a driver of an automobile to prevent the driver from losing his way, during driving for example in a strange place, there has been developed a travel path displaying apparatus, as hereinafter described more in detail, which includes a distance detector for detecting a distance of travel depending upon a running speed of the vehicle and a direction detector for detecting a running direction and an amount of change of direction, from time to time, wherein the current location of the vehicle on a two-dimensional coordinate is successively computed from the respective results of the above-mentioned detections and the location thus computed is memorized and displayed in the form of a constantly changing pattern of continuous point information on a display screen having a map including roads or the like previously displayed thereon, so that the driver may confirm the current location of his vehicle.

In such travel path displaying apparatus, it has been a usual practice to prepare a plurality of area maps which show divided areas, respectively, and to selectively display one of the area maps on the display screen according to the driver's desire. Also, it has been a usual practice to prepare a plurality of area maps of different reduced scales with respect to each of the divided areas and to display the area map having optimum reduced scale on the display screen, depending upon the state of guidance, so that the travel path may be displayed in accordance with the current location calcuated with the corresponding reduced scale.

A usual map is prepared by a method of plane projection, on the basis of lines of longitude and latitude, but a map of larger reduced scale and that of smaller reduced scale are prepared by different methods of projection. Accordingly, it is difficult to treat the maps of larger and smaller reduced scales on a common coordinate system. Furthermore, in a map which is prepared by the method of plane projection on the basis of lines of longitude and latitude, the areas encircled by the respective lines of longitude and latitude are different in size and shape from each other, depending upon the lines of longitude and latitude. Accordingly, it is difficult to treat the respective areas on the common coordinates system.

Particularly, a map having a large reduced scale, such as 1/50,000 or 1/25,000, is prepared on the basis of the UTM coordinates and in case of Japanese map, for example, the map of a whole country is constituted by a plurality of area maps each of which is prepared by the UTM system. In such maps attention is paid only to matching in each of the systems but no attention is paid to the connection between the respective systems. Under the circumstances, at the time of travelling across the connection between the different systems, it is necessary to make conversion of the coordinates for displaying the travel path, in accordance with the changeover from the map based on the former UTM system to that based on the UTM system newly displayed on the display screen, so that complicated processing is required.

A further problem was displaying the current location of a running body, which was obtained by the two-dimensional coordinates as described above, on a map, which was prepared by the method of plane projection on the basis of the lines of longitude and latitude. That is, earth has a spherical surface while a map prepared by the method of projection has a flat surface, so that an error in location is produced on a map, particularly, in case of a map having large reduced scale.

Furthermore, it is noted that the travel path displaying apparatus of this kind has a function of measuring a distance between two points set on the map displayed on the display screen and displaying such distance onto said display screen, and such function occupies an important part of the guidance performed by the travel path displaying apparatus. Under such circumstances, the distance between two points on the map within one area displayed on the screen can be easily calculated by directly obtaining the distance between the points on the same coordinates and then applying arithmetic operation to the distance thus obtained in accordance with the reduced scale of the map, but the distance between the points set on the map which extend over a plurality of areas successively displayed on the display screen cannot be directly calculated if use is made of a map in which there is no matching between the coordinates system in one area and that in the other area.

OBJECTS OF THE INVENTION

The present invention aims at avoiding the problems as described above.

It is a first object of the present invention to provide an apparatus for displaying a travel path of a running body which is arranged to display the travel path on a map displayed on a display screen, in accordance with a reduced scale of said map, in which if the reduced scale of the map is varied or if an area of the map is varied, such variation can be remedied by a simple processing, whereby the current location of the running body is displayed at any time with a high precision with respect to the map.

It is a second object of the present invention to provide an apparatus for displaying a travel path of a running body which is so arranged that a current location of the running body can be displayed with high precision on a map prepared by the plane projection and displayed on a display screen and a travel path up to this time can be roughly displayed on the display screen.

It is a third object of the present invention to provide an apparatus for displaying a travel path of a running body which can measure and display a distance between points which are set over a map including a plurality of areas successively displayed on a display screen, even if use is made of a map in which there is no matching of coordinate systems between the respective areas.

In order to attain the first object as described above, the present invention provides an apparatus for displaying a travel path of a moving body which comprises means for converting a current location of the moving body which was obtained on a two-dimensional coordinate system, into a location on a longitude-latitude coordinate on a map displayed on a display screen, thereby displaying the current location on the map by the longitude and latitude system.

More particularly, the present invention sets an importance on a mesh made of lines of longitude and latitude in a map prepared in accordance with the method of plane projection based on the lines of longitude and latitude and it provides an apparatus for displaying a travel path of a running body in which longitude and latitude values of the reference points in a plurality of area maps of divided areas, for example the longitude and latitude values of a cross point in a mesh, are registered as known factors, respectively, and a constantly changing current location of the running body on a two-dimensional coordinates is converted into a location on the longitude-latitude coordinates, whereby the current location is displayed at a proper position on the map on the basis of the known longitude-latitude values at the reference point on the map displayed on the display screen.

In order to attain the second object as described above, the present invention provides an apparatus for displaying a travel path of a moving body in which a constantly changing current location of the moving body produced on a two-dimensional coordinates by arithmetic operation is converted into a location on longitude-latitude coordinates of a map displayed on a display screen, thereby displaying the current location on a longitude-latitude coordinates system and means is provided to display the travel path of the moving body on a two-dimensional coordinates system on the basis of data concerning location on the original two-dimensional coorinates system, in order to simplify the processing.

Furthermore, in order to attain the third object as described above, the present invention provides an apparatus for displaying a travel path of a moving body in which means is provided to calculate longitude-latitude values of points set on a map displayed on a display screen from reference points on said map and means are provided to calculate and display a distance between the current location and a target point or a distance between target points residing in different areas of each map, on the basis of a difference therebetween on longitude-latitude coordinates.

DETAILED DESCRIPTION OF THE PREFERRED EMBODIMENT

Now, the description will be made on an embodiment of the present invention, with reference to the accompanying drawings.

Figure 1:
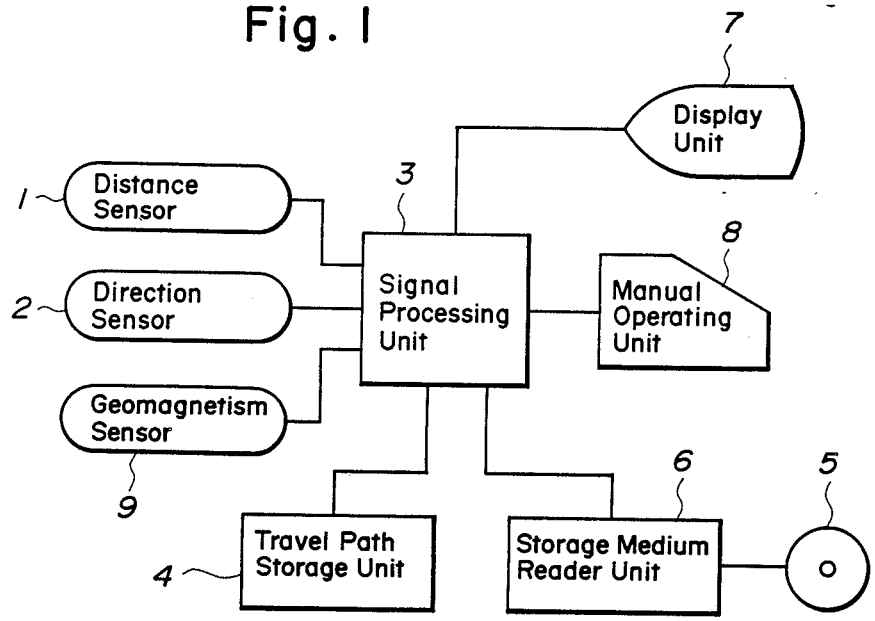
FIG. 1 is a block diagram showing an example of a fundamental construction of the travel path displaying apparatus according to the present invention.

FIG. 1 shows an example of the fundamental construction of the travel path displaying apparatus according to the present invention. The essential constituent factors include a distance sensor 1 of photoelectric, electromagnetic, mechanical contact type or the like, for generating pulse signals at every unit distance, depending on the rotation of the wheel of the vehicle, a direction sensor 2 for generating signals proportional to add amount of change of running direction of the vehicle which consists of a gyroscope, for example, for detecting the change of angular velocity in the yawing direction, a signal processing unit 3 which serves to count the number of the pulse signals sent from the distance sensor 1 to measure the distance of travel of the vehicle and also serves to decide the change of the running direction of the vehicle on the basis of the output signal of the direction sensor 2 to successively compute the current location of the vehicle on the two-dimensional coordinates at every unit distance of travel of the vehicle, said unit including a CPU for affecting centralized control of the whole system, a programming ROM, a controlling RAM, etc., a travel path storing means (RAM) 4 for successively storing the data of the constantly changing location on the two-dimensional coordinates obtained by the signal processing unit and holding the data as finite and continuous location information corresponding to the current locations of the vehicle, a map information storage medium 5 in which a plurality of map information at every area and every reduced scale are previously stored, a storage medium reader unit 6 for selectively reading out the desired map information from the storage medium 5, a display unit 7 for successively renewing and displaying the current locations of the vehicle, the path of travel and the current running direction and the other information on the same display screen on the basis of the location data stored in the storage unit 4 a manual operating unit 8 for giving a command for operation to the signal processing unit 3 and for affecting various operations including selection of the map to be displayed on the display unit 7, setting of the starting point of the vehicle on the displayed map, change of directions of the displayed map and the travel path, shifting of the displayed position, change of the setting of the displayed form such as the partial enlargement of the display of the map and the travel path, selection of the reduction scale and the like, and a geomagnetism sensor 9 for sensing geomagnetism and detecting an absolute direction.

Figure 2:
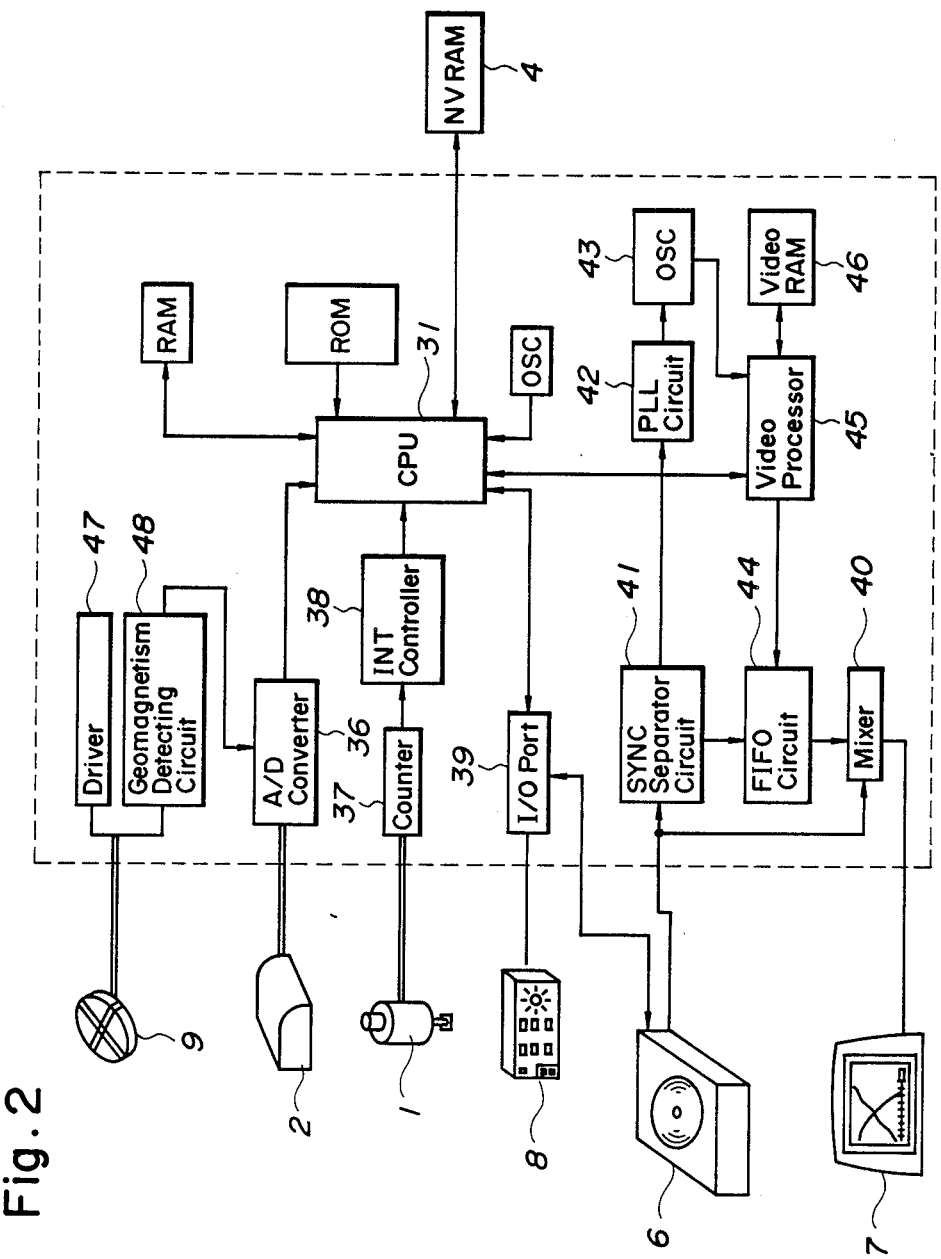
FIG. 2 is a block diagram showing an embodiment of a signal processing unit in the construction shown in FIG. 1.

FIG. 2 shows a detailed construction of an example of the signal processing unit 3.

In the construction as shown in FIG. 2, an output signal of the direction sensor 2 is fed through an A/D converter 36 to a CPU 31. A pulse signal fed from the distance sensor 1 is counted by a counter 37 and a value of the count is fed through a INT controller 38 to the CPU 31. The operating unit 8 and the storage medium reader unit 6 are connected to an I/O port 39 of the CPU 31, so that various control signals are sent and received between them. A map information signal read by the storage medium reader unit 6 is fed to a mixer 40, where said information is mixed with data concerning the travel path display produced by the CPU 31 and displayed by the display unit 7. The map information signal read by the storage medium reader unit 6 is also fed to a synchronizing separator circuit 41, where a synchronizing signal is separated, and said separated synchronizing signal is fed to an oscillator 43 with a PLL circuit 42 and also fed to a FIFO circuit 44. The oscillator 43 with the PLL circuit 42 functions to produce oscillation in synchronized state with a phase of an outcoming signal and it is used to produce synchronized outputs of the map information and the data concerning the travel path display. The FIFO circuit 44 is used to remove the effect of jitter of the synchronizing signal in the map information fed from the storage medium reader unit 6. A video processor 45 functions to write a picture information into a video RAM 46 in accordance with an instruction fed from the CPU 31 and to read out the picture information and feed it to the display unit 7 in synchronized state with another synchronizing signal. The geomagnetism sensor 9 is driven through a driver 47 by an instruction fed from the CPU 31 and a signal detected by a geomagnetism detector circuit 48 is fed through an A/D converter 36 to the CPU 31. The travel path storage unit 4 functions to not only store the data concerning the travel path but also the data concerning the direction of the current location, the sensitivity correction values of the direction sensor 2 and the geomagnetism sensor 9, the correction value of a distance constant of the distance sensor 1, the position of the target point or the like.

Figure 3:
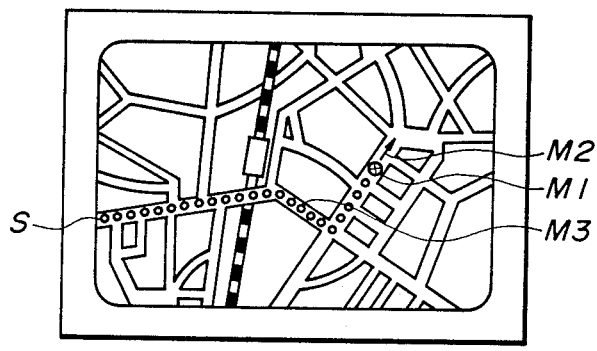
FIG. 3 shows an example of contents of display produced by the travel path displaying apparatus.

In the construction as described above, the selectively read out map is displayed on the display screen of the display unit 7 while the current location (x, y) on the X-Y coordinates is successively computed, as the vehicle travels from the starting point set on the map, by means of the signal processing unit 3 on the previously set reduction scale of the map and the result of the computation is successively sent to the travel path storage unit 4, so that the content of the storage is renewed, constantly read out and sent to the display unit 7. As shown in FIG. 3, the display unit 7 has a display mark M1 indicating the current location of the vehicle on the map displayed on the display screen, a display mark M2 indicating the running direction of the vehicle at the current location and a display mark M3 indicating the travel path from the starting point S to the current location. These marks simulate the running status of the vehicle. In this state, the content of the display of the travel path or the map is subjected to a rotation processing, in accordance with the detection signal of the geomagnetism sensor 9, under the control of the signal processing unit 3, so that the travel path of the moving body may be displayed in the direction corresponding to the direction of the map.

The construction and the operation thus far described are the same as those of the conventional travel path displaying apparatus explained in the description of the prior art of this specification.

In the travel path displaying apparatus as described above, the map information storing medium 5 consists of a laser disc memory, for example, which stores area maps indicating divided areas of the whole country, with eleven kinds of reduction scales, from 1/25,600,000 to 1/25,000 at divisions of ½, and the longitude-latitude values at the reference points in each map based on the lines of longitude and latitude, for example at one or more cross points in the mesh which are previously registered in the storage medium 5, together with the corresponding map information, as known factors, respectively.

In the display screen of the display unit 7, a frame is set to provide a limit of the display of the travel path on the map displayed on the display screen and when the current location displayed on the display screen extends beyond the frame, the signal processing unit 3 detects it and acts to renew the map displayed on the display screen to the one which indicates the next area in the running direction.

In the present invention, at the same time when a predetermined map is selectively read out from its map information storing medium 5 and displayed on the display screen of the display unit 7, the longitude-latitude values at the reference points on the mesh of the map are read out and fed to the signal processing unit 3.

In the signal processing unit 3, the current location on the two-dimensional coordinates obtained as described above is converted to a position on the longitude-latitude coordinates and the position on the map is decided by calculating the length from the reference point of the mesh on the map displayed on the display screen to said position by dividing said length into equal parts per 1° on the latitude. The position thus decided is plotted as the current location. At the same time, the data of the plotted position on the two-dimensional coodinates are successively stored in the travel path storing unit 4.

Furthermore, in the signal processing unit 3, when the plotted current location extends beyond the frame set on the display screen, the map is renewed and then the same processing as described above is applied in accordance with the longitude and latitude values of the reference point in the mesh on the renewed map. Thus the current location is plotted on the map.

Figure 4:
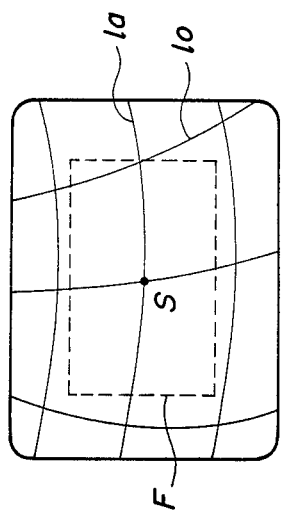
FIG. 4 is a diagram showing interrelation between a reference point in a mesh of a map displayed on a display screen and a frame for affecting changeover of maps set on the display screen.

In more detail, the cross point S located at a substantially central position of the mesh formed by the longitude lines Lo and the latitude lines La on the map, as shown in FIG. 4, is adopted as the reference point and each map is displayed on the display screen so that the cross point S of the mesh is located at the central position of the display screen. The symbol F indicates the frame which forms the limit of display screen and which is used to affect the changeover of the map.

When a map is displayed on the display screen, the longitude-latitude values of the reference point S on this map are recognized. When the renewal processing of the current location of the running body is effected, the variations owing to the unit running of the moving body are added to the longitude-latitude coordinates, and the renewed current location on the map is calculated on the basis of the difference between the longitude-latitude values and those of the reference point. If the calculated position resides within the frame F, the renewed current location is displayed on the same map.

If the calculated position resides outside of the frame F, the map is renewed in accordance with the moving direction of the moving body, so that the next map is displayed on the display screen. The longitude-latitude values of the reference point S on the renewed map are recognized again, and the current location on the renewed map is calculated from the difference between the longitude-latitude values of the reference point S and those of the current location. Thus the current location is displayed on the new map.

If the system for displaying the current location of the moving body according to the present invention is adopted, it is possible to always display the current location of the moving body, with precise position and precise direction relative to the map displayed on the display screen, because even when the map according to the UTM system in which no attention is paid to the connection of one system with the other system is used, the reference point S in each map according to the UTM system displayed on the display screen is treated as a known factor, so that the current location on the map displayed on the display screen is calculated on the reference point S on the map at each time when the map is renewed.

When such processing is applied, it is possible to treat the maps as those belonging to a common coordinates system by the signal processing unit 3 even in the case of the map prepared by the plane projection based on the lines of longitude and latitude where the maps in the respective areas are different in size and shape from each other, so that it is easy to display the travel path corresponding to each map.

A map, particularly a map of small reduction scale, includes an error in itself, owing to the fact that the earth is spherical while the map is flat. According to the present invention, the error as mentioned above is adjusted and it is possible to display the current location with high precision relative to a map even in the case of a map of small reduction scale.

According to the present invention, the current location on the two-dimensional coordinates is converted to the location on the longitude-latitude coordinates on the map displayed on the display screen and the current location is displayed on the longitude-latitude coordinates system. Such processing is effected as described below.

Figure 5A:
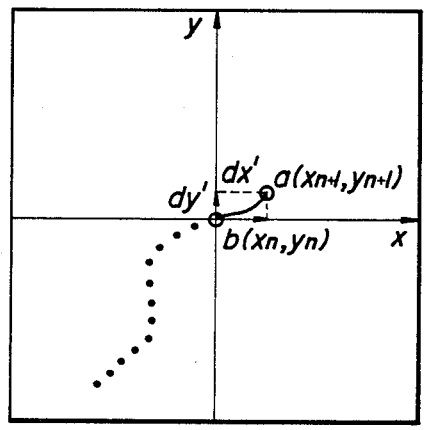
FIGS. 5(a), 5(b) and 5(c) illustrate states of a picture displayed by the travel path displaying apparatus in which the present invention is carried into effect.
Figure 5B:
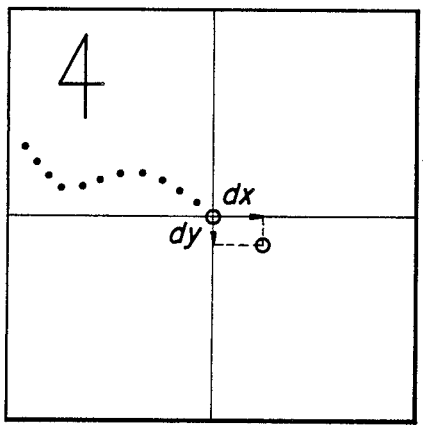
Figure 5C:
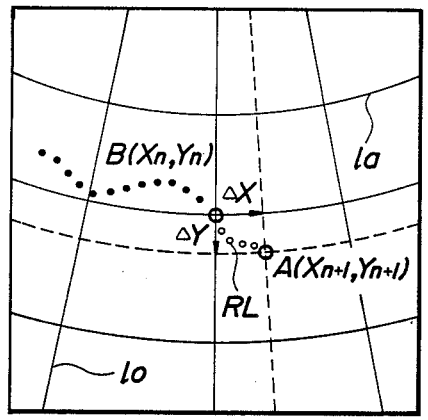

Firstly, on the basis of the difference between the renewed current location a $(Xn+1, Yn+1)$ and the former current location b $(Xn, Yn)$ on the two-dimensional coordinates, as shown in FIG. 5($a$), the amounts of changes $dx'$, $dy'$ of the current location on the two-dimensional coordinates are obtained.

$$dx' = Xn+1 - Xn \quad (1)$$

$$dy' = Yn+1 - Yn \quad (2)$$

Then, the rotation processing is applied to make the map coincide with the absolute direction on map, as shown in FIG. 5($b$), and the amount of change $dx$ of the current location in the longitude direction and the amount of change $dy$ of the current location in the latitude direction are obtained.

Finally, the amount of change $\Delta X$, $\Delta Y$ in the respective directions on the longitude-latitude coordinates are obtained by multiplying the amounts of change $\Delta dx$ and $\Delta dy$ in the longitude direction and the latitude direction by longitude conversion coefficient $Rx$ and latitude conversion coeffecient $Ry$, respectively, and the current location A $(Xn+1, Yn+1)$ renewed and displayed on the map is calculated by adding said $\Delta X$, $\Delta Y$ to the former current position B $(Xn, Yn)$ on the longitude-latitude coordinates which has been already calculated in the former stage.

$$Xn+1 = Xn + Rx \cdot dx \quad (3)$$

$$Yn+1 = Yn + Ry \cdot dy \quad (4)$$

The longitude conversion coefficient $Rx$ and the latitude conversion coefficient $Ry$ are calculated at each time, on the basis of the longitude and the latitude of the former current location. In FIG. 5($c$), La indicates the longitude line and Lo indicates the latitude line.

Figure 6:
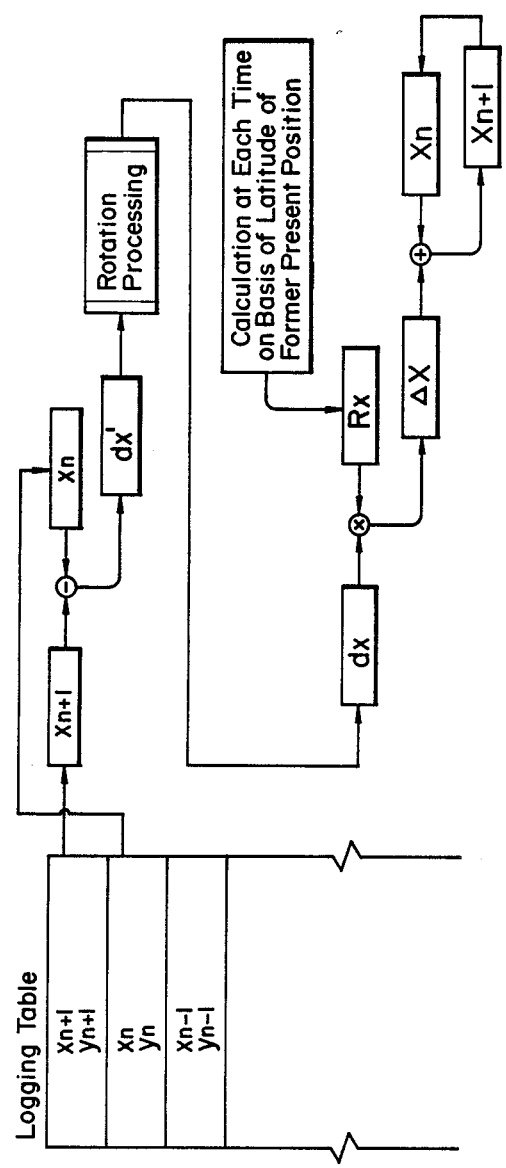
FIG. 6 is a flow chart showing calculations when the present invention is carried into effect.

FIG. 6 indicates a flow of calculation processing in the calculation of the current location $Xn+1$ on the longitude-latitude coordinates on the basis of the data of the current location on the two-dimensional coordinates continuously stored in the logging table. Of course, the same process is used, with regard to $Yn+1$.

Thus, it will be understood that according to the present invention the relative current locations of the moving body on the two-dimentional coordinates, which have been decided by the arithmetic processing as described above, are displayed as absolute positions on the map displayed on the display screen, so that it is possible to display the current location with high precision on the map prepared by the method of plane projection.

The present invention provides a means for displaying the travel path RL up to the current location A on the two-dimensional coordinates system, on the basis of the data concerning the position on the two-dimensional coordinates stored in the logging table in view of the fact that some deviation in display of the travel path up to the current location relative to the map has no substantial effect on the guidance if the current location of the moving body on the map displayed on the display screen is precisely displayed. By this means, it is not necessary to effect the conversion processing of the data of the travel path RL displayed on the display screen to the data of the longitude-latitude coordinates system in accordance with the map displayed on the display screen, and therefore the work load on the processing in the signal processing unit 3 is relieved.

The apparatus according to the present invention provides a means which can operate to set the target position to any desired point on the map displayed on the display screen, by moving a cursor by the operation effected by the manual operating unit 8 and then obtain and display the distance between the current location and the set target point or the distance between the target points on the basis of the difference in position on the longitude-latitude coordinates. The processing is effected in the manner as described below.

Description will be made to the case where two target points 01 and 02 on a planned course of travel are set on a plurality of area maps which will be successively renewed and displayed on the display screen and the distance between these target points 01 and 02 is to be measured.

Figure 7:
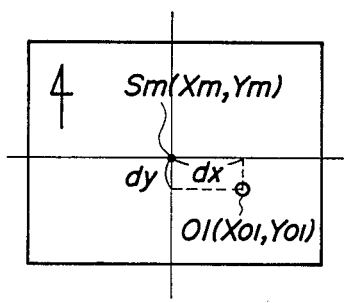
FIG. 7 shows a positional relationship between a reference point on a map and a target point set on the map.
Figure 8:
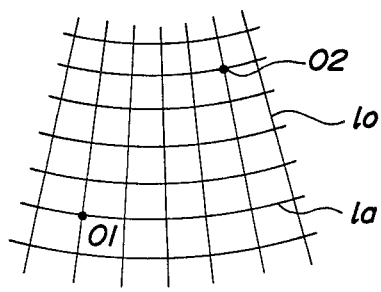
FIG. 8 shows a positional relationship between two target points on longitude-latitude coordinates.

Firstly, the signal processing unit 3 functions to recognize the longitude-latitude values $(Xm, Ym)$ of the reference point Sm or the map on which the first target point 01 is set and displayed, as shown in FIG. 7, and adopt the target 01 as an offset position from the reference point Sm. Then, it functions to obtain the distances $dx$ and $dy$ from the reference point Sm to the target point 01 on the two-dimensional coordinates by arithmetic operation and then convert them into the distances $\Delta X$, $\Delta Y$ on the longitude and the latitude by multiplying the respective values $dx$ and $dy$ by the longitude conversion coefficient $Rx$ and the latitude conversion coefficient $Ry$. The longitude-latitude values $(X01, Y01)$ of the target point 01 on the map are calculated by adding the above values $\Delta X$ and $\Delta Y$ to the longitude-latitude values (Xm, Ym) of the reference point Sm.

$$X01 = Xm + Rx \cdot dx \quad (5)$$

$$Y01 = Ym + Ry \cdot dy \quad (6)$$

Where $Rx \cdot dx = \Delta X$, $Ry \cdot dy = \Delta Y$

The longitude conversion coefficient Rx and the latitude conversion coefficient Ry are calculated from the relationship between the linear distance per 1° of the longitude and the linear distance per 1° of the latitude on the map displayed on the display screen.

In the same manner, the longitude-latitude values (X02, Y02) of the target point 02 on the map are calculated on the basis of the longitude-latitude values (Xn, Yn) of the reference point Sn on the map on which the second target point 02 is set.

$$X02 = Xn + Rx' \cdot dx \quad (7)$$

$$Y02 = Yn + Ry' \cdot dy \quad (8)$$

Then, the signal processing unit 3 functions to obtain the differences in latitude and longitude between the target points 01 and 02 converted to the positions on the latitude-longitude coordinates of the map and then calculate the lengths (Km) on the latitude and the longitude of the map which correspond to the latitude difference and the longitude difference thus obtained, by using the above-described conversion coefficients. At this time, the conversion coefficients corresponding to the latitude and longitude of the position between the target points 01 and 02.

Figure 9:
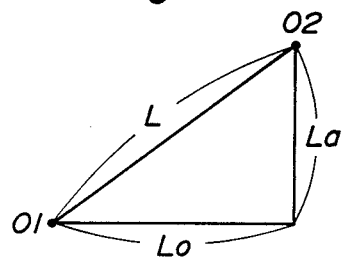
FIG. 9 shows an interrelation between longitude difference and latitude difference at two target points and a distance between the target points.

Finally, it is assumed that the longitude difference between the target points 01 and 02 is (Lo) Km and the latitude difference is (La) Km, as shown in FIG. 9, then the signal processing unit 3 functions to obtain the linear distance L between the target points 01 and 02 by the arithmetic operation as described below and display the measured distance L between the target points 01 and 02 on the predetermined position of the display screen.

$$L = \sqrt{Lo^2 + La^2} \quad (9)$$

When the system for displaying the current location of the moving body according to the present invention is adopted, the reference point S on each map displayed on the display screen is treated as a known factor even when a map prepared by the method of plane projection, having reference area of longitude and latitude lines, that is, a map in which no attention is paid to the connection between one system and the other system, is used, so that it is possible to treat the respective maps according to the common coordinate system and consequently it is possible to precisely measure and display the absolute distance between the target points 01 and 02 which are set over a plurality of different area maps which are successively displayed on the display screen. If desired it is, of course, possible to measure the distance between the target points on the same area map, by the same processing.

As described above, the earth has a spherical surface while the map has a flat surface, so that a error is cause in the projection method particularly in case of the map having small reduction scale, but the present invention serves to adjust for such error and makes it possible to measure a distance between target points with high precision set on a map even on a map having small reduction scale.

Figure 10:
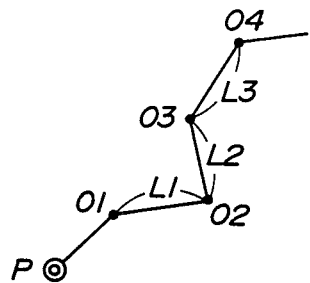
FIG. 10 shows a state where a plurality of target points are set.

When a plurality of target points 01, 02, 03, 04 ... are set on a planned course of travel extending over a plurality of maps indicating different are which are successively displayed on a display screen, as shown in FIG. 10, a first distance L1 between the points 01 and 02 as measured by the method as described above, a second distance L2 between the points 02 and 03 a third distance L3 between the points 03 and 04, ... are successively added, so that a total distance from the first point to the current location is displayed.

When the display is in its travel path displaying mode, the distance from the current location P of the moving body to the first target point 01 on the map displayed on the display screen is measured in the same manner and added to the total distance, so that the distance from the current location P to the final target point On is displayed on the display screen. As the moving body continues its travel in the travel path displaying mode, distances between the current location and the target point are measured each time the moving body has travelled for a predetermined distance and the distance displayed on the display screen is renewed at each time.

It will be understood that the present invention provides an apparatus for displaying a travel path of a running body in which a constantly changing location of the running body on two-dimensional coordinates is successively computed and the current location of said running body is displayed successively, in accordance with the data thus computed, on a display screen having a map previously displayed thereon. Latitude-longitude values of a reference point on a mesh consisting of latitude and longitude lines on a map displayed on a display screen, for example, is treated as a known factor and the current location of the moving body on the two-dimensional coordinates is converted to a position on latitude-longitude coordinates. The current location on the map is calculated from the known latitude-longitude values and displayed on the display screen. Accordingly, even if the reduction scale of the map varies at the time of displaying the travel path on the map displayed on the display screen in accordance with the reduction scale on the map, the travel path can be displayed with high precision relatively to the picture displayed on the display screen.

The present invention provides an apparatus for displaying a travel path of a running body of the above kind, in which the current location of the running body on the two-dimensional coordinates is converted to a position on latitude-longitude coordinates on the map displayed on the display screen and the current location on the map is displayed on the latitude-longitude coordinates system, while the travel path of the running body is displayed on the two-dimensional coordinates system, together with the data of position of the running body on the two-dimensional coordinates system. Accordingly, it is possible to provide the display of the current location with high precision relatively to the map prepared by the method of plane projection, while it is possible to display the travel path without adversely affecting the guidance, while effectively reducing the work load.

Furthermore, the present invention provides an apparatus for displaying a travel path of a running body of the above kind, in which latitude-longitude values of a reference point on a mesh consisting of longitude and latitude lines previously set on each map are registered as known factors and latitude-longitude values at the position of a target point set on the map are calculated from the reference point on the map, whereby a distance between target points is calculated and displayed on the basis of differences of position on the latitude-longitude coordinates at the respective target points. Accordingly, even when a map, in which no matching is prepared between coordinates of the respective areas, is renewed and displayed, it is possible to precisely and easily measure and display a distance between target points set over a plurality of maps.

We claim:

1. An apparatus for displaying a travel path of a running body in which a constantly changing location of the running body on two-dimensional coordinates is successively computed and the current location of the running body is displayed successively, in accordance with the data thus computed, on a display screen having a map previously displayed thereon, comprising:

means for registering as known factors longitude and latitude values of reference points, each of which is formed by an intersection point of a mesh consisting of lines of longitude and latitude on the map, the map having divided areas;

means for converting the current location of the running body on the two-dimesional coordinates to a position on latitude-longitude coordinates;

means for calculating the current location on the map, on the basis of the known latitude-longitude values of a reference point on the map displayed on the display screen; and means for displaying the current location on the display screen, wherein the latitude-longitude of a position of a target point set on a map displayed on the display screen is calculated from the reference point of the map and means is provided to obtain and display a distance between the current location of the running body and the target point from a difference in position between latitude-longitude coordinates of the current location of the running body displayed on the map of one area and of the target point displayed on the map of another area.

2. An apparatus according to claim 1, which includes means for displaying on the display screen a distance from the current location of the running body to the target point set on a map of an area other than that currently displayed on the display screen when the current location of the running body exits from the display screen.

3. An apparatus according to claim 1 further comprising a means for obtaining and displaying a distance between target points set on maps of different areas on the basis of a difference in position of latitude-longitude coordinates of the target points.

4. An apparatus according to claim 3, further comprising means for successively setting a total distance between the current location of the running body and all inital target point on maps of different areas.

* * * * *